United States Patent [19]
Moedritzer

[11] 3,855,186

[45] Dec. 17, 1974

[54] PHOSPHORUS-CONTAINING POLYMERS

[75] Inventor: Kurt Moedritzer, Webster Grove, Mo.

[73] Assignee: Monsanto Company, St. Louis, Mo.

[22] Filed: July 17, 1972

[21] Appl. No.: 272,249

[52] U.S. Cl............ 260/80 PS, 260/75 P, 260/78 S, 260/88.7 B, 260/92.8 A, 260/93.5 A, 260/606.5 P, 260/857 UN, 260/873 R, 260/874 R, 260/898 R, 260/899 R, 260/DIG. 24

[51] Int. Cl....... C08f 5/00, C08f 45/00, C08f 41/00

[58] Field of Search.... 260/80 PS, DIG. 24, 606.5 P

[56] References Cited
UNITED STATES PATENTS
3,160,593  12/1964  Spencer ........................... 252/49.8

*Primary Examiner*—Christopher A. Henderson

[57] ABSTRACT

Phospholene oxide polymer and process for preparation. The polymers are useful as flame retardants.

4 Claims, No Drawings

PHOSPHORUS-CONTAINING POLYMERS

The present patent application refers to subject matter also set forth in co-pending patent application Ser. No. 272,239, filed July 17, 1972.

The present invention relates to the compositions of matter which are based upon phosphorus-containing oligomers and polymers which have utility as fire retardant and anti-static compositions and as functional fluids. The present compositions may also be used as additives with organic polymers to yield commercial high molecular weight polymers. The resultant products containing the said phosphorus polymers as additives can be formed into fibers, films and other shaped articles having greatly improved fire-retardant properties.

The invention is based on products from the homopolymerization of phospholene oxides. The phospholene oxides may be obtained by reacting alkyl or arylphosphonous dihalides, of 1 to 20 carbon atoms, such as $CH_3PCl_2$ or $C_6H_5PCl_2$, with a conjugated 1,3-diene such as butadiene, dimethylbutadiene or isoprene, according to equation (A) which illustrates typical structures, as described below. The final products are obtained by hydrolysis. The diene may also be halogen substituted e.g. chloroprene.

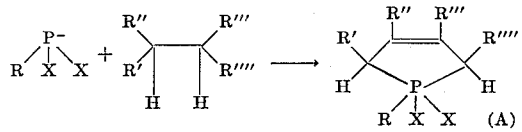

or

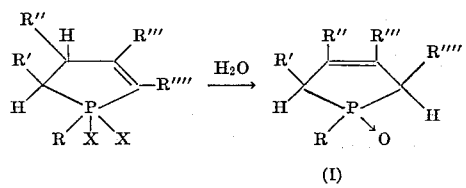

or

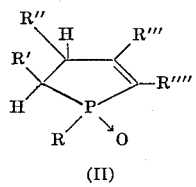

The various stereo isomers may be used instead of the molecular forms shown here.

Although this reaction can be performed in excess diene or a hydrocarbon as solvent, it has been found that there is an unexpected increase in the reaction rate when nitrobenzene or other related alkyl or aryl nitrocompounds preferably nitrohydrocarbons of 4 to 20 carbon atoms are used as solvent. This is especially advantageous, since generally long reaction times at room temperature are needed with $C_6H_{14}$ solvent. Low temperatures, e.g. 0°–50°C are preferred in order to prevent homopolymerization of the diene. The nitrocompound may also be used as a mixture with other solvents.

The resulting phospholene oxides (whether as structure I or II depends on R and X) may be polymerized using anions, such as in t-BuMgCl, lithium alkyls, sodium naphthalene, aluminum alkyls and others e.g. $BF_3$ or $(t-BuO)_2$ to give polymers of the general structure shown below, (R is hydrocarbyl such as alkyl, aryl, aralkyl and alkylaryl having from 1 to 20 carbon atoms, X is halogen such as F, Cl, Br, or I; R', R'', R''' and R'''' are hydrogen or hydrocarbyl as described. R can also be a substituted alkyl or aryl group, such as chloromethyl or bromophenyl). The monomer may be polymerized neat, or in a solvent such as tetrahydrofuran, dioxane, diglyme, etc.

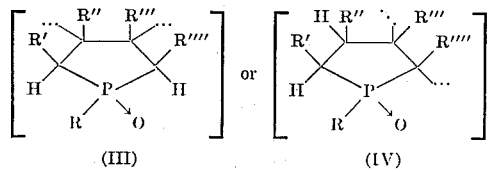

or mixtures of these characteristic repeating units, or a typical structure, which Equivalent to (IV):

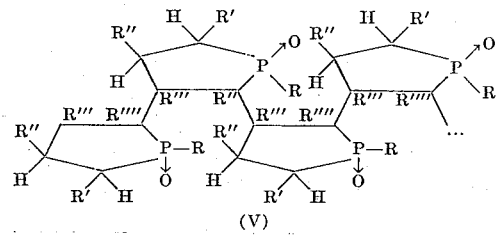

The phospholene oxide monomer can also be crosslinked to a polymeric form by conducting the polymerization in the presence of a crosslinking agent such as divinylbenzene, divinylphenylphospine oxide and others.

For $R=C_6H_5$ and $R' = R'' = R''' = R'''' = H$ (derived from butadiene) a white, water-insoluble polymer is obtained, which softens at ca. 260°–270°C and which is stable up to 300°C. This material is found to have a molecular weight distribution ranging from 200 to 1,000,000. The phosphorus content of this polymer is about 16% (calcd. 17.6%). When applied as 10% by weight additive to polyester or nylon, the polymer raises the oxygen index (defined below) of polyethylene terephthalate or nylon polymer from 20 to 25.

For $R = CH_3$ and $R' = R'' = R''' = R'''' = H$ (derived from butadiene) the resulting product has a phosphorus content of ca. 27%. When applied as 10% by weight as an additive, this polymer raises the oxygen index of polyester or nylon from 20 to 28–29.

For $R=C_2H_5$ and $R' = R'' = R'''' = H$ and $R''' = CH_3$ (derived from isoprene) the resulting product has a phosphorus content of ca. 23.5%. When applied as 10% by weight as an additive to the above organic polymers, the oxygen index is raised from 20 to about 27–28.

In general the preferred proportions of the phospholene oxide components incorporated with organic polymers is from 1% to 25% by wt. relative to the total composition.

One area of utility embraces the use of phospholene oxide polymers as additives in organic polymers such as acrylonitrile, styrene, butadiene-styrene, vinylchloride, vinylidenechloride, vinylacetate and isobutylene.

EXAMPLE 1

A quantity of 2 g of cupric stearate, 228 g (1.95mole) of methylphosphonous dichloride and 324 g (6.0 mole) of butadiene are charged into a glass-lined pressure vessel. The mixture is stirred at room temperature for 3 weeks. After this period, the excess butadiene is vented and unreacted methylphosphonous dichloride removed in a vacuum. The remaining solid is hydrolyzed by adding it to ice-cooled water. After neutralization of the aqueous solution to pH7, the 1-methyl-3-phospholene-1-oxide is extracted with chloroform and the resulting chloroform solution is dried and distilled. The phospholene oxide, distilling at 75°–80°C at 1 mm pressure, is obtained in a quantity of 215 g representing a yield of 95%.

The advantageous use of nitrobenzene as solvent is demonstrated by the data shown in the following Table.

Yields of 1-methyl-3-phospholene-1-oxide after 18 hours reaction time at room temperature are shown below (nitroxylenes, nitrotoluenes and nitronaphthalenes are also useful).

| Solvent | Yield % |
| --- | --- |
| nitrobenzene | 79 |
| benzonitrile | 21 |
| butadiene | 19 |
| dioxane | 19 |
| tetrahydrofuran | 18 |
| methylenedichloride | 16 |
| chlorobenzene | 12 |
| chloroform | 10 |
| n-hexane | 7 |

Homopolymerization of the above phospholene oxide is effected in the following manner. A quantity of 2.7 g of the freshly distilled phospholene oxide monomer under exclusion of moisture and air is placed in a Schlenk tube in an atmosphere of dry nitrogen and 40 ml of dry, freshly distilled (over LiAlH$_4$) tetrahydrofuran is added. The solution is stirred at room temperature and catalytic amounts of a 2.3 molar solution of t-butylmagnesium chloride in tetrahydrofuran are added. Initially, the solution turns brown, and within a short time a white precipitate begins to form. The solution becomes rather thick and the temperature within the tube rises to 50°–60°C. The mixture is stirred for 1 hour, filtered, washed with dry tetrahydrofuran and dried in a vacuum oven at 60°C over night, yield 2.6 g or 96%.

The white solid polymer is analyzed to give 50.2%C, 8.0%H and 24.3%P; calculated for R=CH$_3$ and R'=R''=R'''=R''''=H in structure (III) or (IV) above: 51.7%C, 7.8%H and 26.7%P. Gel permeation chromatography indicates a molecular weight range from 1,000 to one million. The product melts in the range from 170°–220°C and under a nitrogen atmosphere remains stable at temperatures in excess of 300°C for extended periods of time. Thermogravimetric analysis of a sample of the polymer (in nitrogen) indicates onset of thermal decomposition at 400°C.

The phospholene oxide polymer when used as an additive is applied as a solid powder into the molten organic polymer e.g. nylon, or is calendered or milled as a solid or a solution into solid particles of the organic polymer, e.g. a polyester.

In general, the preferred proportions of the phospholene oxide components as additives is from 1 to 25% by weight relative to the total composition. Indicated compositions have the proportions regulated in accordance with the desired properties of the product.

The resultant phosphorus-containing polymer composition when tested as a fire retardant additive, for example, at a weight of polymer equivalent to 2.5 wt% P in the total composition, in polyethylene terephthalate and nylon 6,6 causes the ASTM 2D–2863 oxygen index of each sample to change from about 20 to 29–29.

OXYGEN INDEX TEST (ASTM 2D–2863)

A 2 × 6 inches sheet of desired thickness is mounted in a U-shaped frame surrounded by a chimney. The atmosphere in the chimney is a controlled mixture of nitrogen and oxygen. The ratio of oxygen to nitrogen is varied so that a sample ignited on the top will sustain combustion. The oxygen index number is expressed by:

Oxygen Index = $[O_2]/[O_2] + [N_2] \times 100$ where $[O_2]$ is the volume-fraction of oxygen.
$[N_2]$ is the volume fraction of nitrogen.

The oxygen index number is defined as that oxygen and nitrogen mixture that will last sustain combustion, when varied as described.

EXAMPLE 2

A quantity of 1 g of cupric stearate, 179 g (1 mole) of freshly distilled phenylphosphonous dichloride and 162g (2.0 mole) of butadiene are charged into a glass reactor. The mixture is stirred at room temperature for 4 weeks. The reaction product is worked up as described in Example 1 and 110 g (0.62 mole) of 1-phenyl-2-phospholene-1-oxide is obtained, yield 62%, b. p. 165°C at 1 mm pressure. The phospholene oxide solidifies on standing, and gives a crystalline solid melting at 75°C.

Homopolymerization of this material is effected by the procedure of Example 1. A quantity of 15 g of the above phospholene oxide gives 8.5 g of a tetrahydrofuran-insoluble fraction and 5.5 g of a tetrahydrofuran-soluble fraction. Both fractions contain C, H and P in the mole ratio 10:11:1 with a phosphorus content of 17%. The THF-insoluble polymer softens at ca. 260°–270°C and as shown by thermogravimetric analysis is stable at temperatures in excess of 300°C. Gel permeation chromatography indicates a molecular weight range from 2,000–16,000 with a weight average molecular weight $M_w$ 4300. The THF-soluble fraction consists of products having a molecular weight range from 350–2,000.

The resultant phosphorus-containing polymer when tested as a fire retardant additive (10% by weight additive which is about 1.7 wt.% P in the total mixture) in polyethylene terephthalate or nylon 6, 6 by the procedure described in Example 1 causes the oxygen index of each sample to change from about 20 to 25–26.

EXAMPLE 3

Using the procedure of Example 1 but substituting isoprene for butadiene, 1,3-dimethyl-3-phospholene-1-oxide is prepared and polymerized by the method of Example 1. The resulting polymer, having a phosphorus content of 25% when incorporated as an additive in (a) polyester (b) nylon (c) polyacrylonitrile (d) polyvinyl chloride, and (e) polystyrene imparts a flame retardant properties to the said polymers.

EXAMPLE 4

Using the procedure of Example 2 but substituting isoprene for butadiene, 3-methyl-1-phenyl-2-phospholene-1-oxide is prepared and polymerized by the method of Example 1. The resulting polymer, having a phosphorus content of 16%, is stable at temperatures in excess of 300°C and when tested as flame retardant as described in Example 1 causes the oxygen index of polyethylene terephthalate or nylon-6,6 to change from 20 to 25–26.

EXAMPLE 5

Using the procedure of Example 1 with n-hexylphosphonous dichloride and butadiene as reactants 1-n-hexyl-3-phospholene-1-oxide is prepared and polymerized by the method of Example 1. The resulting polymer, having a phosphorus content of 16.5% when incorporated as an additive in polyester or nylon imparts flame retardant properties.

EXAMPLE 6

Following the procedure of Example 1 with n-octylphosphonous dichloride and butadiene as the reactants 1-n-octyl-3-phospholene-1-oxide is prepared and polymerized by the method of Example 1. The resulting polymer, having a phosphorus content of 14.4% when incorporated as an additive in polyester or nylon imparts flame retardant properties.

EXAMPLE 7

Following the procedure of Example 1 with n-decylphosphonous dichloride and butadiene as the reactants 1-n-decyl-3-phospholene-1-oxide is prepared and polymerized by the method of Example 1. The resulting polymer, having a phosphorus content of 12.5%, when incorporated as an additive in polyester or nylon imparts flame retardant properties.

EXAMPLE 8

Following the procedure of Example 1 with n-dodecylphosphonous dichloride and butadiene as reactants 1-n-dodecyl-3-phospholene-1-oxide is prepared and polymerized by the method of Example 1. The resulting polymer, having a phosphorus content of 11.4% when incorporated as an additive in polyester or nylon imparts flame retardant properties.

EXAMPLE 9

Following the procedure of Example 2 with α-naphthyl phosphonous dibromide and butadiene as reactants 1-α-naphthyl-2-phospholene-1-oxide is prepared and polymerized by the method of Example 1. The resulting polymer, having a phosphorus content of 13.5%, when incorporated as an additive in polyester or nylon, imparts flame retardant properties.

EXAMPLE 10

Samples of 1-methyl-3-phospholene-1-oxide, prepared as described in Example 1, and 1-phenyl-2-phospholene-1-oxide, prepared as described in Example 2 in the mole ratio 3:1 are dissolved in dry tetrahydrofuran and polymerized by the procedure of Example 1. The resulting copolymer, having a phosphorus content of 22%, when incorporated as additives in polyethylene terephthalate or nylon imparts flame retardant properties.

EXAMPLE 11

A quantity of 1 g of cupric stearate, 116 (0.89 mole) of freshly distilled ethylphosphonous dichloride and 191g (3.53 mole) of butadiene are charged into a glass reactor. The mixture is stirred at room temperature for 4 weeks. The reaction product is worked up as described in Example 1 and 98g (0.75 mole) of 1-ethyl-3-phospholene-1-oxide was obtained, yield 85%, b.p. 85° at 1 mm pressure. Homopolymerization of this material is effected by the procedure of Example 1. A quantity of 2.9 g of the above phospholene oxide gives 0.9 g of a tetrahydrofuran-insoluble fraction. This fraction contains C:H:P in the mole ratio 6:11:1 with a phosphorus content of 23.5%. The THF-insoluble polymer softens at ca. 180° and as shown by thermogravimetric anaylsis is stable at temperatures in excess of 300°C. Gel permeation chromatography indicates a molecular weight range from 2,000–20,000. A THF-soluble fraction consists of products having a molecular weight range from 350–2,000.

The resultant phosphorus polymer when tested as a fire retardant additive (10% by weight) in polyethylene terephthalate or nylon-6, 6 by the procedure described in Example 1 causes the oxygen index of each sample to change from about 20 to 27–28.

EXAMPLE 12

Using the procedure of Example 1 but substituting dimethyl butadiene for butadiene 1,3,4-trimethyl-3-phospholene-1-oxide is prepared and polymerized by the method of Example 1. The resulting polymer, having a phosphous content of 21.5%, when incorporated as an additive in polyester or nylon imparts flame retardant properties.

What is claimed is:

1. A phospholene oxide homopolymer characterized by the repeating units

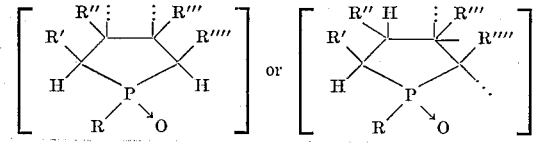

and mixtures thereof in which R is hydrocarbyl of 1–20 carbon atoms and R', R'', R''', R'''' are hydrogen or hydrocarbyl groups of 1–20 carbon atoms with the polymer having a molecular weight ranging from 200 to 1 million.

2. A phospholene oxide homopolymer characterized by the repeating units

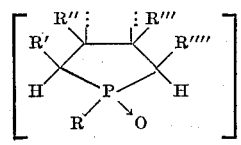

in which R', R'', R''', R'''' are hydrogen or hydrocarbyl groups of 1–20 carbon atoms with the polymer having a molecular weight of 200 to 1 million.

3. A phospholene oxide homopolymer characterized by the repeating units in which R is hydrocarbyl of 1–10 carbon atoms and R', R'', R''', R'''' are hydrogen or hydrocarbyl groups of 1–20 carbon atoms with the polymer having a molecular weight of 200 to 1 million.

4. Process for the preparation of phospholene oxide homopolymer, characterized by the repeating unit, and mixtures thereof in which R is hydrocarbyl of 1–20 carbon atoms and R', R'', R''', R'''' are hydrogen or hydrocarbyl groups of 1–20 carbon atoms with the polymer having a molecular weight ranging from 200 to 1 million which comprises contacting the corresponding monomer with an anionic polymerization catalyst.

* * * * *